Patented May 5, 1942

2,282,241

UNITED STATES PATENT OFFICE 2,282,241

MAKING DOLOMITE BRIQUETTES FOR USE IN THE PRODUCTION OF MAGNESIUM

John S. Peake, Midland, Mich., assignor to The Dow Chemical Company, Midland, Mich., a corporation of Michigan No Drawing. Application May 26, 1939, Serial No. 276,006

6 Claims. (Cl. 75—67)

This invention relates to a method for the production of strong abrasion resistant briquettes containing a magnesium carbonate or oxide and a reducing agent, for use in the preparation of metallic magnesium.

In the electrothermic reduction of dolomite or of magnesite by means of reducing agents such as aluminum, silicon, or the equivalent ferrosilicon, the mixture of reagents has been employed in powdered and in briquette form. It has been observed that the powdered charge tends to cause difficulty during introduction of the charge continuously into the reduction furnace. Under the reduced pressure customarily employed in the reaction zone, powdered material is too readily carried over to the condenser, contaminating the distilled magnesium. The briquettes heretofore employed have not been sufficiently hard to resist abrasion as they come in contact with one another and with the walls of the vessels in which they are handled. Even when such high pressures as 15,000 to 30,000 pounds per square inch are employed in forming briquettes from the customary powdered mixture of dolomite and reducing agent, the shaped pieces lack sufficient coherence to prevent powdering due to attrition, and the natural consequence is that in the thermal reduction zone sufficient powder is rubbed off from the briquette either to form solid deposits on the walls of the furnace chamber or to contaminate the metal in the condensing zone after distillation.

Many of the difficulties heretofore encountered in preparing briquettes from dolomite or like charges for magnesium production furnaces have arisen from the fact that the powdered calcined dolomite contains too much moisture and carbon dioxide or compounds which yield these substances when heated. The result of the presence of these undesirable agents is that the briquettes crack and disintegrate at reduction temperatures, and give lowered yields of magnesium. This latter difficulty is particularly apparent in the use of briquettes made using water as a binder, as has been proposed in the art.

It is accordingly an object of the present invention to provide a mechanically strong briquette of dolomite or of a mixture of magnesite and quick-lime, or equivalent magnesium source, with a reducing agent such as aluminum, ferrosilicon or silicon, which briquette can be produced under reasonable conditions of pressure and which will withstand the abrasive forces encountered during the thermal reduction operations without powdering or crumbling. Further objects will become apparent from the following description.

According to the present invention, a mechanically strong briquette, whereby the aforesaid object may be attained, can be produced by "degassing" dolomite or equivalent material, such as a mixture of magnesite and quick-lime, together with the reducing agent to be employed, at a temperature up to 1000° C., and preferably under reduced pressure, to remove carbon dioxide, water, and compounds capable of producing the same when heated. The so-treated composition is then compressed into briquettes of suitable size and shape under pressures in the range from about 2700 to 5000 pounds per square inch. In order to avoid disintegration of the briquettes as a result of moisture absorption, they are immediately placed in a muffle furnace or other suitable retort and heated to about 1000° C., whereby the hardening of the composition is effected. After the briquettes have been hardened and cooled to room temperature, they may be stored in closed cans or in a desiccator without deterioration, retaining their characteristic hardness. In practice, it has been customary to employ the hardened briquettes in the production of metallic magnesium soon after they have been subjected to the hardening operation. They may even be transferred out of access to cold air directly from the hardening zone to the reduction zone without cooling.

In a preferred manner of carrying out the invention, calcined dolomite or an equivalent source of magnesium is crushed and ground to a suitable degree of fineness, and preferably to about 200 to 350 mesh. The reducing agent is crushed and ground to a similar state of subdivision. The finely divided magnesium yielding substances and the finely divided reducing agent are mixed and the mixture heated preferably in an inert atmosphere or in vacuum at temperatures from about 650° to 1000° C., and preferably near 800° C. The time required may vary widely, from a few minutes to several hours, depending on the equipment and materials employed. The degassed charge is cooled to room temperature and the finely divided powder compressed in a mold of the desired shape and size to produce briquettes, suitable pressure being in the range from 2700 to 5000 pounds per square inch, and preferably about 3500 to 4000 pounds per square inch. At this stage in operation, the briquettes have low mechanical strength and crumble easily when subjected to attrition. As soon as practical and before enough time has elapsed to cause disintegration, the briquettes are placed in a muffle, or equivalent furnace and heated to a hardening temperature below that at which thermal reduction commences, suitably to about 1000° C. If desired, heating may be gradual with, for example, 200 centigrade degrees rise in temperature per hour until the furnace temperature has reached about 1000° C. This latter temperature is maintained for about 1 hour, more or less, whereafter the muffle is allowed to cool slowly to room temperature. The resulting briquettes, as previously stated, may be stored in desiccators without losing their strength characteristics or they may be employed immediately for the preparation of metallic magnesium by known reduction processes. The hardening operation, at about 1000° C., may be carried out, especially when large briquettes are being produced, in an atmosphere of air if desired, or in the case of small briquettes, the high temperature zone may be filled with an inert gas such as hydrogen or the heat treatment may be carried out under conditions of high vacuum.

Tests have shown that, while non-carbonaceous binders, such as silicates, may be employed if desired, no material advantage is to be obtained by employing binders for the briquette material as the above-described method produces a briquette without the use of a binder which has all of the strength characteristics now deemed desirable. Small amounts of various compounds which will be of use in the thermal reduction zone wherein metallic magnesium is prepared may, if desired, be incorporated in the mix from which the briquettes are prepared. Care must be taken to see that such addition agents are freed from moisture, carbon dioxide, or compounds capable of producing gases under the conditions employed in the reduction step. Among such compounds which may be added in small amount with advantage may be named fluorspar which is customarily employed as a catalyst in the reducing operation.

It is to be understood that a mixture of magnesium oxide and lime or magnesite and quicklime is, for the present purpose, equivalent to dolomite and that a calcined mixture of these materials subjected to the treatment previously outlined can be briquetted with a reducing agent to produce an article of sufficiently high mechanical strength to avoid the difficulties heretofore encountered.

The following example illustrates the practice of the invention:

Example 100 parts of calcined dolomite and 20 parts by weight of 75 per cent ferrosilicon, each having a particle size of about 200 mesh, were mixed and degassed by heating for 20 hours at 700° C. under a high vacuum. The powdered material was compressed into briquettes about 3 inches thick and 3.75 inches in diameter employing a pressure of 3650 pounds per square inch. Compression was applied over a period of 45 seconds between the time the piston first encountered the powdered material in the mold and the time of pressure release. The so-formed briquettes were heated as soon as practical and before enough time had elapsed to cause disintegration in a muffle furnace in an atmosphere of air with a temperature rise of 200 centigrade degrees per hour until the temperature reached 1000° C. The latter temperature was maintained for about 1 hour, after which the heat was turned off and the briquettes were allowed to cool gradually to room temperature in the closed furnace. The resulting briquettes were very hard and abrasion resistant under the conditions employed in the customary method of thermal reduction to produce metallic magnesium. When employed in the preparation of magnesium, none of the customary difficulties usually resulting from powder formation were encountered.

Several briquettes were made as described in the example. After baking they had an apparent density of 1.7, and when tested for crushing strength were found to resist breaking until pressures averaging 335 pounds per square inch were applied. The weakest of the baked briquettes was crushed under a load of over 250 pounds per square inch. Several two year old baked briquettes withstood loads near 300 pounds per square inch before breaking. By way of comparison, several unbaked briquettes of the same composition withstood average crushing loads of only 121 pounds per square inch, the strongest unbaked briquette being crushed when a load of 158 pounds per square inch was applied. The increased strength of the briquettes made according to the invention is evidence of their greater utility as compared with the briquettes of the prior art. No crumbling or powdering is encountered in operation when using the new briquettes in the manufacture of magnesium.

The mixes employed in the preparation of the herein-described briquettes may have any of the customary proportions of magnesium-containing material and reducing agent, the said proportions varying with the concentration of magnesium oxide in the mineral employed and with the particular reducing agent selected. To illustrate, 100 parts of a typical dolomite containing about 35 to 40 percent magnesium oxide may be mixed with from 12 to 25 parts or more of ferrosilicon depending upon the silicon content of the latter reducing agent. Similarly, a dolomite such as that described above may be mixed with from 14 to 20 parts, more or less, of finely divided aluminum. If magnesite is the magnesium source employed, calcium oxide and reducing agent will be added in proportion so as to produce a mixture having approximately the chemical composition of those previously described.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. The method which comprises subjecting a calcined mixture of a magnesium-containing compound selected from the class consisting of magnesium carbonate and magnesium oxide and mixtures containing the same which are capable of being reduced to form magnesium in finely divided form together with a finely divided reducing agent for the said magnesium-containing material to a degassing temperature up to about 1000° C. for a period sufficient to remove from the said mixture moisture, carbon dioxide, and other materials capable of yielding gases under the conditions of thermal reduction of magnesium-containing compounds, thereafter compressing the said finely divided mixture into briquettes and then heating the so-formed briquettes to a hardening temperature below that at which thermal reduction commences, thereby to produce briquettes of improved mechanical strength and hardness.

2. The method according to claim 1, wherein the initial finely divided mix is of a particle size between about 200 and about 350 mesh.

3. The method according to claim 1, wherein the degassing operation is conducted in an inert atmosphere at a temperature between 650° and 1000° C.

4. The method which comprises mixing calcined dolomite and silicon or ferrosilicon, both of approximately 200 to 350 mesh particle size, in proportion suitable for employment in the thermal reduction of dolomite to produce metallic magnesium, subjecting the so-formed powdered mixture to a degassing temperature in the range from about 650° to 1000° C. in an inert atmosphere for a period sufficient to remove from the said mixture moisture, carbon dioxide, and other materials capable of yielding gases under the conditions of thermal reduction of magnesium-containing compounds, thereafter compressing the said finely divided mixture under pressures in the range from 2700 to 5000 pounds per square inch, and immediately thereafter heating the so-formed briquettes gradually to a temperature near 1000° C., thereby to produce briquettes of improved mechanical strength and hardness.

5. The method according to claim 1, wherein the briquettes are heated with a gradual temperature rise of about 200 centigrade degrees per hour until the temperature is about 1000° C., the latter temperature being maintained for about an hour, whereupon the briquettes are allowed to cool gradually in the closed furnace to room temperature.

6. The method according to claim 4, wherein the briquettes are heated with a gradual temperature rise of about 200 centigrade degrees per hour until the temperature is about 1000° C., the latter temperature being maintained for about an hour, whereupon the briquettes are allowed to cool gradually in the closed furnace to room temperature.

JOHN S. PEAKE.